Aug. 7, 1951     I. SNEVA     2,563,559
CIRCULAR SAW HAVING VIBRATION DAMPING MEANS
Filed Dec. 22, 1949
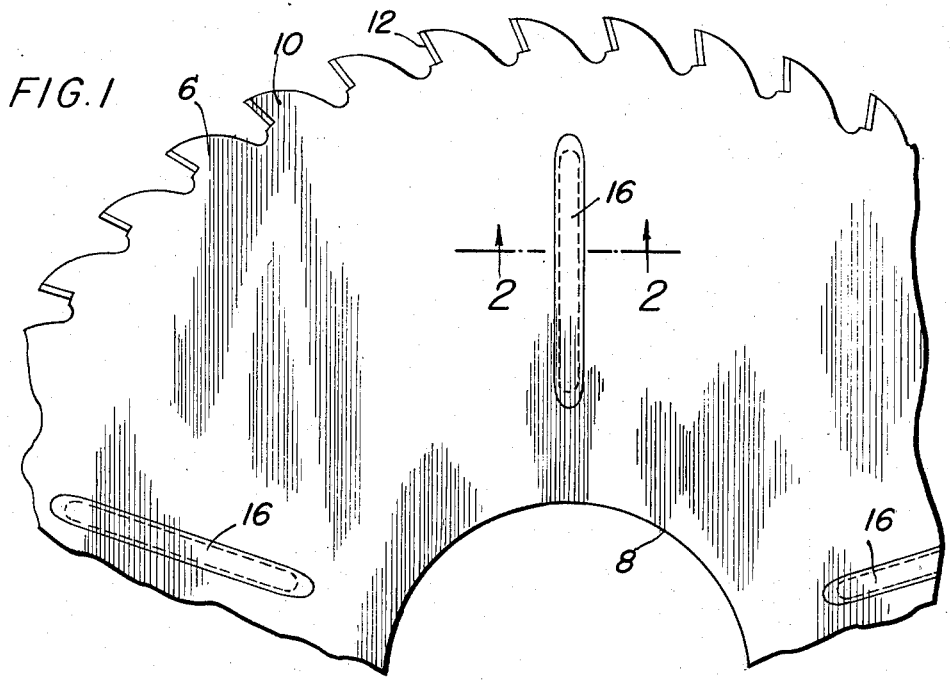
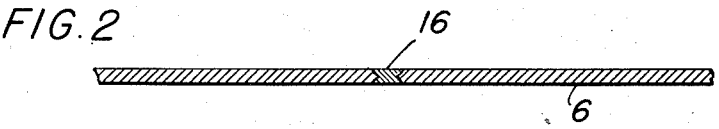
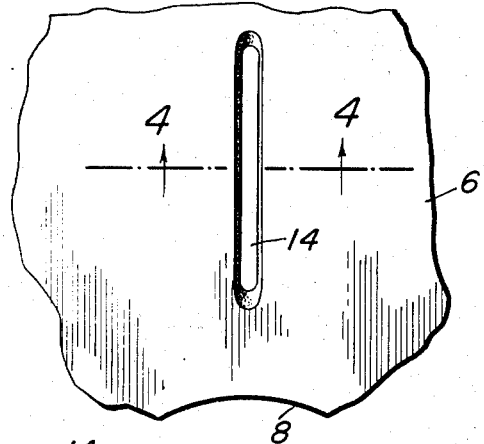
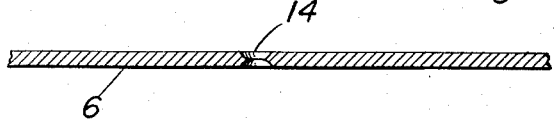
INVENTOR
INGOLF SNEVA
By *William, Rich & Rose*
Attorneys

UNITED STATES PATENT OFFICE 2,563,559

CIRCULAR SAW HAVING VIBRATION DAMPING MEANS

Ingolf Sneva, Bedford, Ind., assignor to W. F. Meyers Company, Incorporated, Bedford, Ind., a corporation of Indiana Application December 22, 1949, Serial No. 134,408

1 Claim. (Cl. 143—133)

This invention relates to circular saws. The general object of the invention is to provide a circular saw which during use will vibrate less, and will therefore produce smoother cut surfaces, than circular saws of the prior art.

In the making of circular saws, the thin circular blank out of which the saw is made often warps during the tempering heat treatment due to strains set up in the metal during the quenching operation. Warping may also occur in circular saws having teeth faced or tipped with tungsten carbide because of the heat applied during the brazing operation. Therefore, it is customary to subject the tempered saw blank to a hammering operation on an anvil by an expert saw-smith in a manner well known in the art. This hammering operation transfers the strains in the steel blank from one place to another and more or less equalizes the tension in the steel, with the result that the warpage in the steel disc is substantially eliminated so long as the saw is not in use. But when the saw is run at the customary high cutting speed, the centrifugal forces created in the saw are added to any strains existing in the saw, and may cause the cutting edge of the saw to vibrate with the result that the saw is noisy and the surfaces cut by it are not smooth. A warped condition in a rotating saw is particularly objectionable in one having teeth tipped or faced with tungsten carbide, because tungsten carbide is very brittle and the high-frequency vibration of the teeth laterally may chip the fine edges of the tungsten carbide. Therefore, the invention (hereinafter described) is particularly useful when embodied in circular saws having teeth tipped or faced with tungsten carbide, but it is also useful in circular saws made entirely of steel.

It is old in the art to provide circular saws with open slots variously arranged, for the purpose of dissipating a portion of the heat produced in the saw when it is in use. Such open slots, however, do not substantially reduce the noise and vibration of the saw when it is in use, and may even increase such noise and vibration.

The present invention is the result of the discovery that if a circular saw is provided with slots, which are radially arranged, and if those slots are substantially filled with a material softer than the material of which the major portion of the saw is made, the vibration of the saw and the noise created by it when in use are very definitely decreased and even substantially eliminated. In the preferred form of the invention, hereinafter described, the slots are radially arranged in the saw and are filled with a soft metal, such as Babbitt metal which has a period of vibration different from the period of vibration of the steel of which the major portion of the saw is made. It will be understood, however, that the radial slots may be filled with material other than Babbitt metal, such as a metal or metal alloy having a fairly low melting point or a plastic material.

The invention will be understood from the following description, taken in connection with the accompanying drawing in which Fig. 1 is a face view of a circular saw embodying the invention; Fig. 2 is a section through one of the slotted and filled portions, on the line 2—2 of Fig. 1; Fig. 3 is a fragmentary face view of a portion of the saw, showing one of the slots before it has been filled; and Fig. 4 is a section on the line 4—4 of Fig. 3.

The drawing shows a circular saw having a steel body portion 6 provided with the usual central opening 8, and with teeth 10 which are faced or tipped with tungsten carbide in a conventional manner as indicated at 12.

As will be obvious from Figs. 1, 3 and 4, the body portion 6 of the saw blank (before it is tempered) is provided with a plurality of slots 14. As hereinbefore mentioned, these slots are radially arranged. In the drawing, the steel body portion of the saw is shown provided with five radial slots 14, but it is to be understood that more or less than that number of slots may be provided. The slots 14 are preferably formed in the saw blank with a milling cutter having a cutting face of any suitable shape. The slots 14 illustrated in the drawing may be made with a 90° included angle milling cutter applied to both faces of the saw blank, thereby providing slots the side and end walls of which are wider at their faces than at their interior portions due to the fact that those walls are beveled inwardly from each face of the saw, as best shown in Figs. 2 and 4. The saw blank is then tempered, the tungsten carbide tooth facings 12 are attached to the blank by brazing, and any warping is substantially eliminated by hammering by a skilled saw-smith, all in the usual ways. It has been found that the work of the saw-smith is facilitated by the existence of the slots 14, probably due to the fact that during the hammering operation the metal can be "drawn" into the slots.

Then all of the slots 14 are substantially filled, as indicated at 16, with a material softer than the steel of which the saw blank is made; and this filling material 16 is finished off at both faces so that it is flush with the faces of the saw blank 6. While various metals and even a plastic compound may be used for the filling 16, I have found that a particularly satisfactory material for this purpose is Babbitt metal having a low melting point and shrinking but little on cooling, which may be cast into the slots 14. As will be obvious from the drawing, the fillings 16 are positively retained in the slots 14 by the forms of the walls of those slots 14 as hereinbefore described; but it is obvious that said filling 16 may be retained in the slots 14 in other ways. After the slots 14 have been filled with the fillings 16, the faces of the saw blank and the faces of the fillings may be finished by grinding and polishing in the usual way.

Since the inserts 16 have a frequency vibration different from that of the steel portion of the saw, the inserts 16 reduce the vibrations which occur when the saw is rotated at the usual high speeds. Such a reduction of vibration of the saw is highly beneficial, particularly in the case of circular saws having teeth tipped or faced with tungsten carbide, as hereinbefore explained. Besides exerting a damping effect on vibration, the inserts 16 also greatly reduce the "whining" or noise produced by the saw during use. This damping effect of the inserts 16 is apparent from the fact that the saw blank, when it is suspended and is subjected to a blow, produces far more vibrations and a more pronounced ring when the slots 14 are open, than after said slots have been filled with the filling material 16.

A comparison of the surfaces of material cut by a saw embodying the present invention with those cut by a similar saw having open slots or no slots at all, shows that a saw embodying the invention gives better results as regards the smoothness of the surfaces in the cut material.

What is claimed is:

A circular saw, the body portion of which is made of steel having therein a plurality of radially arranged slots the side and end walls of which are beveled inwardly from each face of the saw, the said slots being filled with a cast metal softer than the steel of which the saw is made, and the surfaces of the steel body portion and of the cast metal portions being finished so that both faces of the saw are continuously smooth parallel surfaces.

INGOLF SNEVA.

REFERENCES CITED

The following references are of record in the file of this patent:

UNITED STATES PATENTS

| Number | Name | Date |
|---|---|---|
| 411,189 | Grey | Sept. 17, 1889 |
| 877,799 | Rider | Jan. 28, 1908 |

FOREIGN PATENTS

| Number | Country | Date |
|---|---|---|
| 183,743 | Switzerland | July 16, 1936 |